United States Patent
Minkenberg et al.

(10) Patent No.: US 8,121,122 B2
(45) Date of Patent: Feb. 21, 2012

(54) METHOD AND DEVICE FOR SCHEDULING UNICAST AND MULTICAST TRAFFIC IN AN INTERCONNECTING FABRIC

(75) Inventors: Cyriel Minkenberg, Gutenswil (CH); Francois G. Abel, Rueschlikon (CH); Enrico Schiattarella, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 12/047,146

(22) Filed: Mar. 12, 2008

(65) Prior Publication Data

US 2008/0219269 A1     Sep. 11, 2008

(30) Foreign Application Priority Data

Aug. 23, 2006  (WO) .................. PCT/IB2006/052924

(51) Int. Cl.
 *H04L 12/28*  (2006.01)
(52) U.S. Cl. ........................................ 370/390; 370/432
(58) Field of Classification Search .................. None
See application file for complete search history.

(56) References Cited

U.S. PATENT DOCUMENTS

| | | | |
|---|---|---|---|
| 6,212,182 B1* | 4/2001 | McKeown | 370/390 |
| 6,477,169 B1 | 11/2002 | Angle | |
| 6,515,991 B1* | 2/2003 | McKeown | 370/390 |
| 7,058,751 B2 | 6/2006 | Kawarai | |
| 7,453,898 B1* | 11/2008 | Cohen et al. | 370/414 |
| 2002/0099900 A1* | 7/2002 | Kawarai et al. | 710/317 |

FOREIGN PATENT DOCUMENTS

| | | |
|---|---|---|
| JP | 2005045626 A | 2/2005 |
| WO | 2005048501 A2 | 5/2005 |

\* cited by examiner

*Primary Examiner* — Chirag Shah
*Assistant Examiner* — Otis L Thompson, Jr.
(74) *Attorney, Agent, or Firm* — William Stock; Anne Vachon Dougherty

(57) ABSTRACT

A method for scheduling unicast and multicast traffic in an interconnecting fabric performs within each time slot the following steps. First a multicast cell scheduling (61) and independently thereof a unicast cell scheduling (62) is performed. Then, the unicast cell schedule and the multicast cell schedule are merged to a merged schedule (63), wherein in the case a scheduled connection cannot be included in the merged schedule the scheduled connection is included in the merged schedule in a later time slot (66, 63).

11 Claims, 4 Drawing Sheets

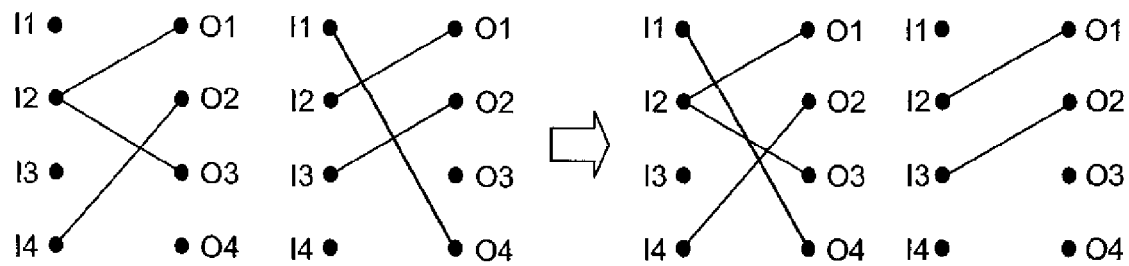
Fig. 4a    4b    4c    4d
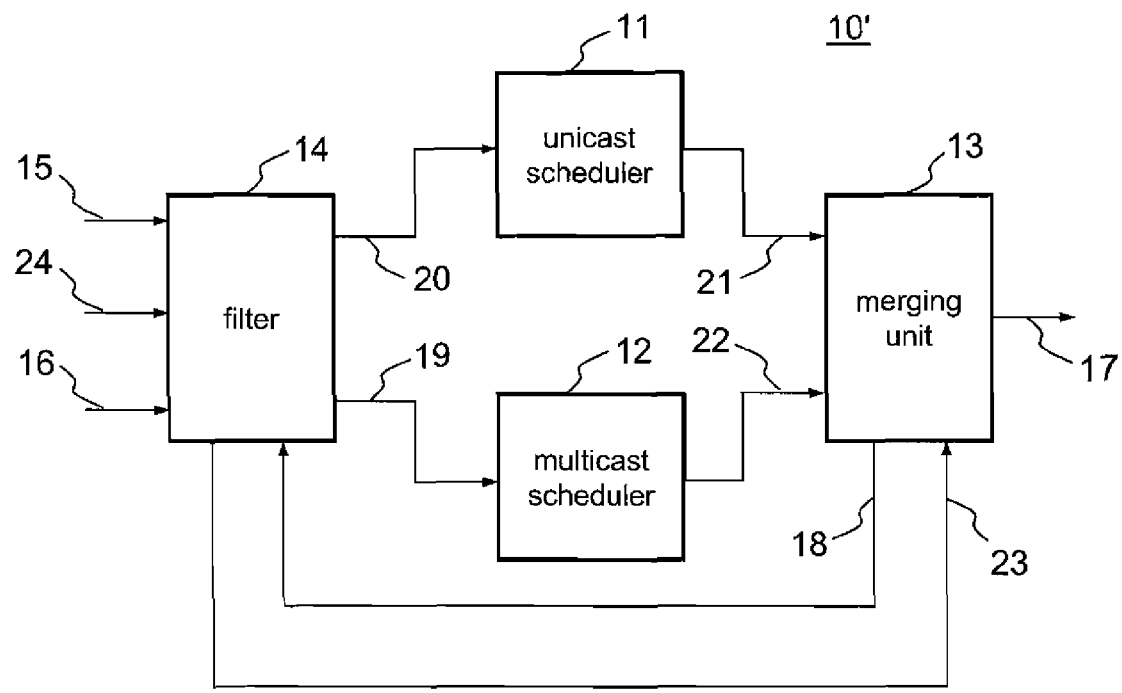
Fig. 5

METHOD AND DEVICE FOR SCHEDULING UNICAST AND MULTICAST TRAFFIC IN AN INTERCONNECTING FABRIC

TECHNICAL FIELD

The present invention relates to computer networks in general and to a method and a device for scheduling unicast and multicast traffic in an interconnecting fabric in particular. The method and the device may be used in a network device such as a router or a switch used in communications of computing applications.

BACKGROUND OF THE INVENTION

In packet-switched networks, two types of data traffic are usually present: unicast and multicast traffic. In unicast traffic a point-to-point connection is established and data is directed from a single source to a single destination, whereas in multicast traffic a point-to-multipoint connection is established and a data packet is directed from a single source to multiple destinations that receive identical copies of the data packet being transmitted. Usually, switch devices support both traffic types, which means that the switching devices must be able to make multiple copies of an incoming multicast packet and transmit the copied packets on output links.

The vast majority of Internet traffic today consists of unicast traffic. However, efficient support for multicast traffic is essential for communication applications such as audio- and video-conferencing, multimedia content distribution, e.g. radio and TV, and remote collaboration, as well as computing applications such as the implementation of collective operations or snoop-based cache coherency in a parallel computer. Ideally, a switching device should be able to achieve high performance under any mix of the two traffic types.

In M. Andrews, S. Khanna, K. Kumaran, "Integrated Scheduling of Unicast and Multicast Traffic in an Input-Queued Switch", Proc. of IEEE INFOCOM '99, vol. 3, pp. 1144-1151, March 1999, two schedulers are used, namely one for each traffic type. The described scheme consists of scheduling multicast first and using the remaining resources for unicast. This scheme works sequentially. A drawback is that it is not fair, i.e., it does not prevent multicast traffic from starving unicast traffic. A single input loading the switch with multicast packets destined to all the outputs (broadcast) would completely block the flow of unicast packets. The network node cannot guarantee a minimum amount of service to every user and is vulnerable to denial-of-service attacks.

In the state of the art U.S. Pat. No. 6,477,169 Angle et al. a further multicast and unicast scheduling method for a switching device is described. In this embodiment a user has to configure a multicast scheduling frequency that determines how often multicast traffic will be scheduled. If this frequency is set to zero, multicast traffic will not receive any service. If it is larger than zero, multicast traffic will be scheduled at regular intervals. In any given time slot, a decision is made based upon this frequency to schedule multicast traffic or not. If multicast is not to be scheduled in the current time slot, only a unicast scheduling cycle is executed. Otherwise, a unicast and a multicast scheduling cycle are executed in parallel. In this case, the unicast scheduling takes into account the previous multicast results, enlarging the existing multicast schedule with unicast, if possible. In parallel, a new multicast schedule is computed. The key feature of this scheme is that it uses the unicast scheduler and the multicast scheduler in parallel, but every now and then it "prepares" a multicast schedule to be used later, with unicast filling the holes. This means that in this embodiment normally only unicast traffic is scheduled. But at pre-defined timeslots, also multicast schedule is computed. When the multicast schedule is ready, at the next timeslot, the schedule is passed to the unicast scheduler, which tries to enlarge it by performing a scheduling cycle only considering inputs and outputs that are still available. In this scheme conflicts between unicast and multicast are avoided, because the integration is achieved by having unicast add edges to a pre-computed multicast schedule. The unicast scheduler and the multicast scheduler work from time to time in parallel, i.e., they work in form of pipelining, to speed up a serial calculation. The multicast schedule that is calculated is used in a later timeslot, because the unicast scheduler needs information about which outputs are still free. If one tries to use them in the same timeslot, one falls back to a serial scheme; multicast first, and unicast later. In this embodiment the user must manually configure the scheduling frequency. This frequency directly determines the maximum amount of service that multicast can receive. If the actual traffic pattern does not match the expected, programmed value, multicast will not receive enough service and the frequency must be reprogrammed. Traffic conditions are in general extremely hard to predict and may fluctuate strongly, which may require frequent changes in the multicast scheduling frequency; otherwise multicast performance would suffer. Secondly, a latency penalty, depending on the multicast scheduling frequency, is incurred for multicast traffic. This is a result of delaying the issuance of the multicast schedule to the next time slot in which the multicast frequency counter triggers a multicast scheduling cycle. Therefore, if this frequency is low the latency will be very high. In any case, an unnecessary latency is incurred, which is especially undesirable in parallel computing applications. Thirdly, if the multicast scheduling frequency is programmed to a value that does not correspond to the actual value of offered multicast traffic, unfairness may result. In particular, when the frequency is set too low unicast can use an unfair portion of the available bandwidth.

SUMMARY OF THE INVENTION

An object of the invention is to provide a method, a device and a computer program product for scheduling unicast and multicast traffic in an interconnecting fabric, which provides a fair and efficient schedule for unicast and multicast traffic, and which has a low latency for unicast as well as for multicast traffic.

According to one aspect of the invention, the object is achieved by a method, a device and a computer program product for scheduling unicast and multicast traffic in an interconnecting fabric with the features of the independent claims 1, 8 and 11 respectively.

The method for scheduling unicast and multicast traffic in an interconnecting fabric according to the invention performs within each time slot the following steps. A multicast connection scheduling and independently thereof a unicast connection scheduling is performed. Then, the unicast connection schedule and the multicast connection schedule are merged to a merged schedule, wherein in the case a scheduled connection cannot be included in the merged schedule the scheduled connection is included in the merged schedule in a later time slot.

The device for scheduling unicast and multicast traffic according to the invention comprises a unicast scheduler exclusively used for scheduling unicast connections, a multicast scheduler exclusively used for scheduling multicast connections, a merging unit for merging the unicast connection schedule and the multicast connection schedule, and an interconnecting fabric controlled by the merging unit.

The computer program product comprises computer readable program code for performing within each timeslot the following operations when loaded into a processing unit of a computing device for scheduling unicast and multicast traffic. A multicast connection scheduling and independently thereof a unicast connection scheduling is performed. And furthermore, the unicast connection schedule and the multicast connection schedule are merged to a merged schedule, wherein in the case a scheduled connection cannot be included in the merged schedule the scheduled connection is included in the merged schedule in a later time slot.

Advantageous further developments of the invention arise from the characteristics indicated in the dependent patent claims.

Preferably, in the method according to the invention all scheduled connections from the multicast connection schedule are included in the merged schedule, and those scheduled connections from the unicast connection schedule that do not conflict with the scheduled connections from the multicast connection schedule are included in the merged schedule. This is an easy and effective rule for merging the unicast schedule and the multicast schedule.

In an embodiment of the method according to the invention the unicast connection schedule is determined by means of iSLIP, Dual Round Robin Matching DRRM, or Parallel Iterative Matching PIM.

In a further embodiment of the method according to the invention the multicast connection schedule is determined by means of TATRA or Weight Based Algorithm, WBA.

Furthermore, in the method according to the invention unicast cells may be buffered in different queues. With that, head of line blocking is avoidable. This in turn speeds up the forwarding of the unicast cells.

Over and above this, in the method according the invention multicast cells may be buffered in one or more separate multicast cell queues.

Finally, in a further embodiment of the method according to the invention the scheduled connection that could not be included in the merged schedule is favored over a connection which has not been scheduled yet, and is included first in an updated merged schedule. With that, the scheduled connection gets a higher priority than the connections which are not yet scheduled and it is ensured that the scheduled connection does not stay too long in a waiting queue.

In a further embodiment of the device according to the invention the interconnecting fabric is an input queued crossbar switch.

In another aspect of the invention the device may comprise a filter which is arranged in front of the unicast scheduler and the multicast scheduler and which is operable to filter unicast and multicast requests based on the information that is fed back from the merging unit.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating:

FIG. 4a to d an example of bipartite graphs for unicast and multicast traffic before and after merging, FIG. 5 a block diagram of a second embodiment of a scheduler, and FIG. 6 an embodiment of a flow diagram of the entire traffic scheduling.

DETAILED DESCRIPTION OF THE DRAWINGS

Figure 1:
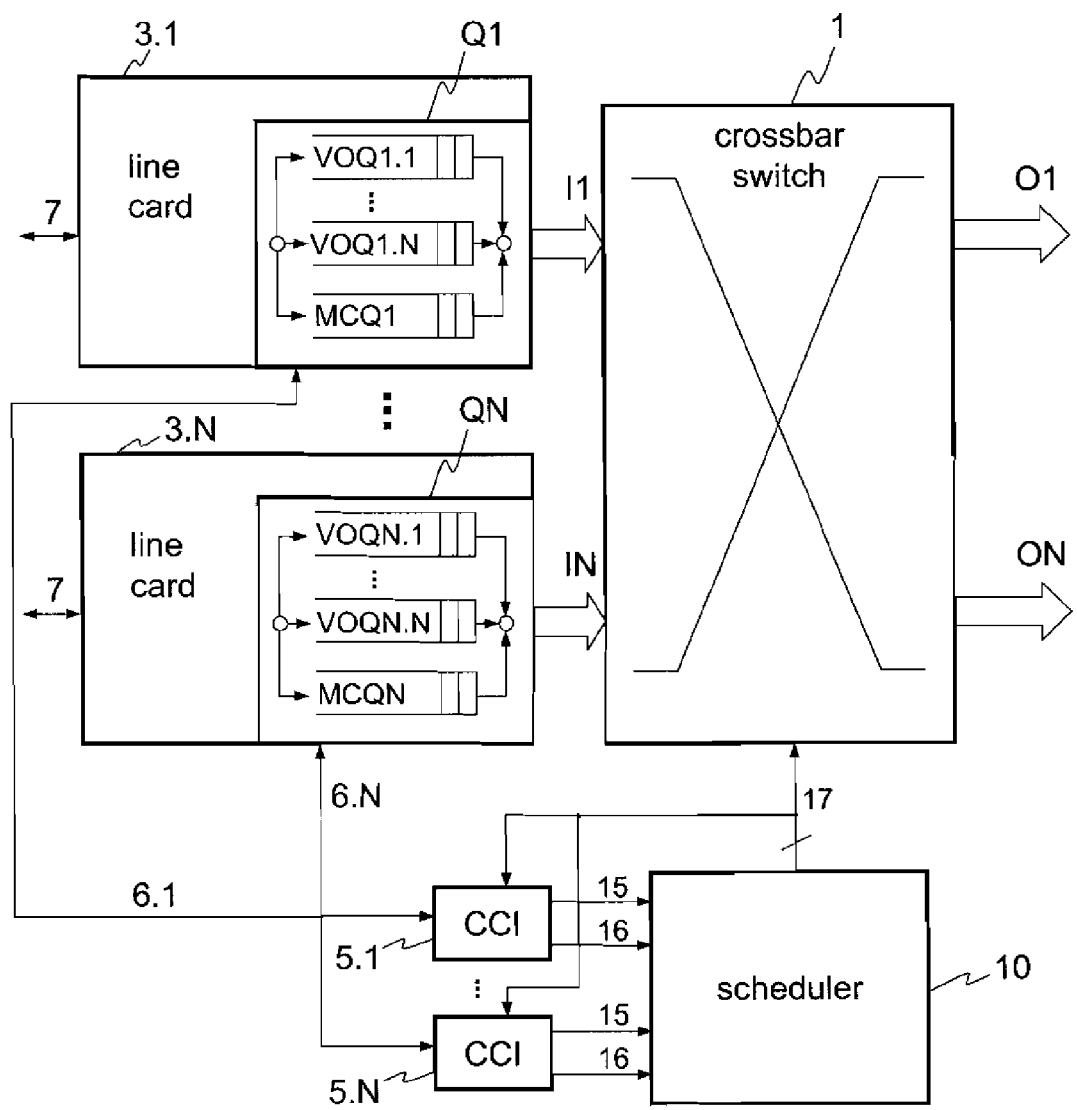
FIG. 1 a block diagram of an input-queued switch for a network.

The switching device according to FIG. 1 is based on an input-queued architecture comprising a number N of line cards 3.1 to 3.N, a crossbar switch 1, having N inputs I1 to IN and N outputs O1 to ON, and a centralized scheduler or arbitration unit 10. The line cards 3.1 to 3.N form the interfaces between the switch and its environment, and receive packets on input links 7 and transmit packets to the inputs I1 to IN of the crossbar 1. The line cards 3.1 to 3.N also keep queues Q1 to QN of incoming packets waiting to be transmitted to the output ports O1 to ON. Unicast packets arriving at a line card are stored in different virtual output queues VOQs depending on their destination. Multicast packets instead are usually stored in a single multicast queue MCQ, although different queuing structures are possible. This means that at each input I of the crossbar switch 1, a separate first in first out, FIFO, queue is maintained for each output, O, as shown in FIG. 1. For example, the first input, I1, of the crossbar switch 1 is coupled to N FIFO queues called virtual output queues VOQ1.1 to VOQ1.N and a multicast queue MCQ1, whereas the second input I2 of the crossbar switch 1 is coupled to N FIFO queues called virtual output queues VOQ2.1 to VOQ2.N and a multicast queue MCQ2. After a forwarding decision has been made, a cell arriving from one of the line cards 3.1 to 3.N is placed in the virtual output queue or multicast queue corresponding to its outgoing port or ports.

In general, the time is divided in slots of equal duration, called timeslots. The duration of a timeslot is equivalent to the time it takes a fixed-size data unit called cell to be transmitted through the switching fabric, i.e., the crossbar switch 1. Incoming data packets are segmented into cells at the inputs and reassembled at the outputs.

A crossbar switch is an interconnecting or switching fabric used to construct switches. Crossbar switches are sometimes referred to as cross-point switches. Crossbar switches have a characteristic matrix of switches between the inputs to the switch and the output of the switch. If the switch has M inputs and N outputs, then a crossbar has a matrix with M×N cross-points or places where the "bars" "cross".

The crossbar switch 1 is a circuit capable of interconnecting the N inputs I1 to IN to the N outputs O1 to ON. At every timeslot, the set of possible input-output connections is limited by the constraints that at most one packet can depart from each input I and at most one packet can arrive at each output O. However, a cell departing from an input I can be received by multiple outputs O. Hence, the crossbar switch 1 offers natural support for multicast traffic because it allows the replication of a packet to multiple outputs O in a single timeslot.

Figure 2A:
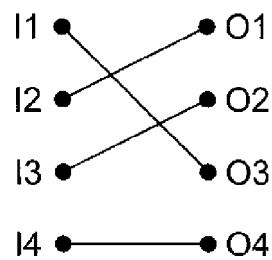
FIG. 2a an example of a bipartite graph for unicast scheduling.
Figure 2B:
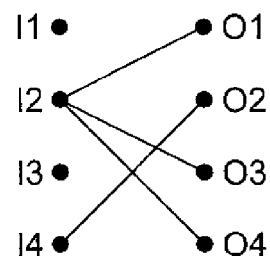
FIG. 2b an example of a bipartite graph for multicast scheduling.

The inputs 15 and 16 of the centralized scheduler 10 are connected via control channels 5.1 to 5.N to the inputs I1 to IN and the output 17 of the centralized scheduler 10 to the control inputs of crossbar switch 1. The centralized scheduler 10 examines the status of the virtual output queues VOQ1.1 to VOQN.N and the multicast queues MCQ1 to MCQN at every timeslot and computes a configuration for the crossbar switch 1, subject to the constraints mentioned above. This operation is equivalent to finding a matching schedule between nodes of a bipartite graph, in which each node represents an input or an output. An example of a bipartite graph having four inputs I1 to I4 and four outputs O1 to O4 is depicted in FIGS. 2a and 2b. The lines connecting the input and output nodes are called edges and correspond to input-output connections made by the crossbar switch 1. A unicast schedule comprises one-to-one connections exclusively as shown in FIG. 2a, whereas a multicast schedule may also comprise one-to-many connections as shown in FIG. 2b.

Figure 3:
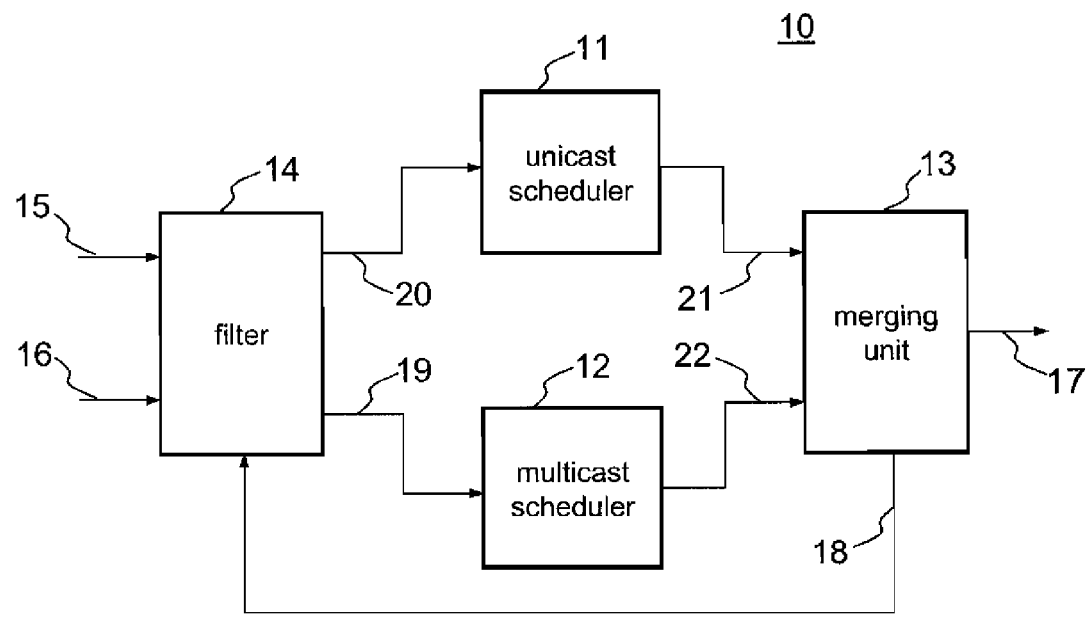
FIG. 3 a block diagram of a first embodiment of a scheduler.

In an embodiment according to the invention as depicted in FIG. 3 the centralized scheduler 10 comprises a request filter 14, a first scheduler 11 for unicast scheduling, a second scheduler 12 for multicast scheduling and a merging unit 13 which is also called integration block. The unicast scheduler 11 and the multicast scheduler 12 are used to compute independently and in parallel unicast and multicast schedules. These schedules are later combined in a single integrated one, called merged schedule, by means of the subsequent merging unit 13. Scheduled connections that cannot be served in the current timeslot, although they have been selected by the corresponding scheduler 11 or 12, receive service in a later timeslot. To this end, the merging unit 13 feeds the unserved connections or information about unserved connections back to the request filter 14.

At the beginning of every timeslot the centralized scheduler 10 receives information about the status of unicast and multicast queues or requests from the line cards 3.1 to 3.N on control links 6.1 to 6.N. Every control links 6.1 to 6.N is terminated by a control channel interface CCI, 5.1 to 5.N. The control channel interfaces 5.1 to 5.N keep track of the status information, i.e., the pending unicast and multicast requests, for every queue of the connected line card. This status information determines the requests which are communicated to the scheduler 10 via control links 15 for unicast and 16 for multicast. The requests are manipulated according to a specific algorithm in the request filter 14 which will be further described below. Unicast and multicast requests, after filtering, are transmitted to the respective schedulers 11 and 12 on links 20 and 19 respectively. Both schedulers 11 and 12 run their algorithms in parallel. The unicast scheduler 11 receives requests from the inputs for non-empty virtual output queues VOQs and produces a one-to-one, i.e., a unicast schedule between the inputs I and the outputs O of the crossbar switch 1. The multicast scheduler 12 examines the fanout of the cells that are at the head of line of the multicast queues and produces a multicast schedule. Fanout splitting is allowed: during a timeslot a multicast cell can receive partial service, being transmitted only to a subset of its destinations. The unicast schedule and the multicast schedule are transferred to the merging unit 13 on links 21 and 22 respectively. As the two schedulers 11 and 12 run in parallel and independently, the schedules they produce in general are overlapping, meaning that the schedules may have conflicting edges. To obtain a consistent configuration for the crossbar switch 1, the merging unit 13 combines the two independent schedules in a single integrated one according to an integration policy, which will be described below, and returns the information comprising grants to the control channel interfaces 5.1 to 5.N and the crossbar switch 1 using link 17. The control channel interfaces 5.1 to 5.N, which can be part of the centralized scheduler 10 or of the line cards 3.1 to 3.N, update their status information according to the merged schedule and issue corresponding grants to the line cards 3.1 to 3.N. It may happen that not all the packets that have been selected by the schedulers 11 and 12 can be served in the current timeslot. Those cells whose service is withdrawn by the merging unit 13 will be served in a later timeslot. The set of edges that are excluded from the integrated schedule is called remainder. Information about these cells is fed back from the merging unit 13 to the request filter 14 on link 18.

In an embodiment according to the invention each connection request experiences two points of contention: first it competes with the other connections belonging to the same traffic type, then with those of the other traffic type. Fairness is ensured if every connection regularly has a chance to win both contentions. Connections that have been selected by their schedulers 11 and 12 respectively still remain unserved if the merging unit 13 excludes them from the integrated schedule. The schedulers 11 and 12 are unaware of the fact that a service granted of them has in fact been withdrawn, so fairness is no longer guaranteed. A solution to this is to make sure that all edges that are part of the remainder actually receive service, albeit in a later timeslot.

Advantages of the method and the device according to the invention are: It achieves higher performance under any mix of the two traffic types. Furthermore, it is better adaptive to the traffic pattern and does not require hand-setting of scheduling parameters such as unicast or multicast scheduling frequencies as described in Angle et al., and also results in a significantly lower latency. A further advantage is, that it is fair, i.e., it guarantees that every packet in the system receives service within finite time. Another advantage is, that it reduces the minimum timeslot duration with respect to the sequential scheme because the schedulers run in parallel and not one after the other. In addition, it is algorithm independent, i.e., it allows the system designer to choose the unicast and multicast scheduling algorithms that fit his needs best. It is also independent of the chosen queuing architectures, and the functionalities can be more easily distributed over multiple chips.

Algorithms which schedule unicast traffic and can be implemented in the unicast scheduler 11 are for example iSLIP, DRRM (Dual Round Robin Matching), and PIM (Parallel Iterative Matching).

In the following the unicast traffic scheduling is described by means of the iSLIP algorithm. iSLIP is an iterative algorithm. During each time slot, multiple iterations are performed to select a crossbar configuration, matching the inputs I1 to IN to the outputs O1 to ON. The iSLIP algorithm uses rotating priority (round-robin) arbitration to schedule each active input and output in turn. iSLIP can be readily implemented in hardware and can operate at high speed. iSLIP attempts to quickly converge on a conflict-free match in multiple iterations, where each iteration consists of three steps. All inputs and outputs are initially unmatched and only those inputs and outputs not matched at the end of one iteration are eligible for matching in the next. The three steps of each iteration operate in parallel on each output and input. The steps of each iteration are:

Step 1: Request. Each unmatched input I sends a request to every unmatched output O for which it has a queued cell.

Step 2: Grant. If an output O receives any requests, it chooses the one that appears next in a fixed, round-robin schedule starting from the highest priority element. The output notifies each input I whether or not its request was granted.

Step 3: Accept. If an input I receives a grant, it accepts the one that appears next in a fixed, round-robin schedule starting from the highest priority element. The pointer to the highest priority element of the round-robin schedule is incremented, modulo N, to one location beyond the accepted output. The pointer to the highest priority element at the corresponding output is incremented, modulo N, to one location beyond the granted input. The pointers are only updated after the first iteration.

By considering only unmatched inputs and outputs, each iteration matches inputs and outputs that were not matched during earlier iterations.

Further information about the iSLIP algorithm can be found in N. McKeown, "The iSLIP Scheduling Algorithm for Input-Queued Switches," IEEE/ACM Trans. Networking, vol. 7, no. 2, April 1999, pp. 188-201.

Further information about the DRRM algorithm can be found in H. Chao and J. Park, "Centralized contention resolution schemes for a large-capacity optical ATM switch," in Proc. IEEE ATM Workshop, Fairfax, Va., May 1998, pp. 11-16.

Further information about the PIM algorithm can be found in Rodeheffer, T. L. and J. B. Saxe, "An Efficient Matching Algorithm for a High-Throughput, Low-Latency Data Switch," Compaq/Digital SRC Research Report no. 162, Nov. 5, 1998.

Algorithms which schedule multicast traffic and can be implemented in the multicast scheduler 12 are for example TATRA and Weight Based Algorithm, WBA. Both are described in N. McKeown and B. Prabhakar, "Scheduling multicast cells in an input queued switch," in Proc. IEEE INFOCOM '96, San Francisco, Calif., March 1996, vol. 1, pp. 271-278 and in B. Prabhakar, N. McKeown and R. Ahuja, "Multicast scheduling for input-queued switches," IEEE J. Sel. Areas in Commun., vol. 15, no. 5, June 1997, pp. 855-866.

It is noted that if unicast and multicast traffic contend for an input, only one edge is lost if multicast wins, whereas multiple edges might be removed if multicast loses. Therefore, in a preferred embodiment, the merging unit 13 uses the following algorithm to decide which packets, among those selected by the unicast and multicast scheduler 11 and 12, receive service in the current timeslot:
1. Serve all packets selected by the multicast scheduler.
2. Serve unicast packets selected by the unicast scheduler that are non-conflicting with the multicast schedule, i.e., whose service does not violate the crossbar constraints.

As a consequence, the remainder always contains only unicast edges if the above mentioned algorithm is performed.

This means that the integrated schedule contains all the multicast edges plus the unicast ones that do not overlap with them. Unicast edges that cannot be added correspond to unicast packets that cannot be served in the current time slot and constitute the "remainder". An example of the merging unit 13 operation is shown in FIG. 4a to 4d. In FIG. 4a the multicast schedule is depicted, which was performed by the multicast scheduler 12. In FIG. 4b the unicast schedule is depicted, which was performed by the unicast scheduler 11. Both schedules are merged by means of the merging unit 13 and result in the bipartite graph shown in FIG. 4c. In FIG. 4d the remainder of the schedule which could not be merged in a single timeslot is shown.

At the beginning of every timeslot the request filter 14 receives from the merging unit 13 information about the inputs and outputs covered by edges in the remainder. In the next time slot, the request filter 14 discards all unicast and multicast requests that involve those resources, thus making sure that the schedulers 11 and 12 do not consider them.

At the end of every timeslot the merging unit 13 issues grants to the line cards 3.1 to 3.N for edges in the current integrated schedule and for edges in the remainder produced in the previous timeslot. The merging unit 13 also produces a new remainder, which may also be empty, and feeds it back to the request filter 14. In other words, unicast packets that cannot be served in the current timeslot will be served right in the next time slot. The resources herefore are free because they have been reserved by the request filter 14.

Figure 6:
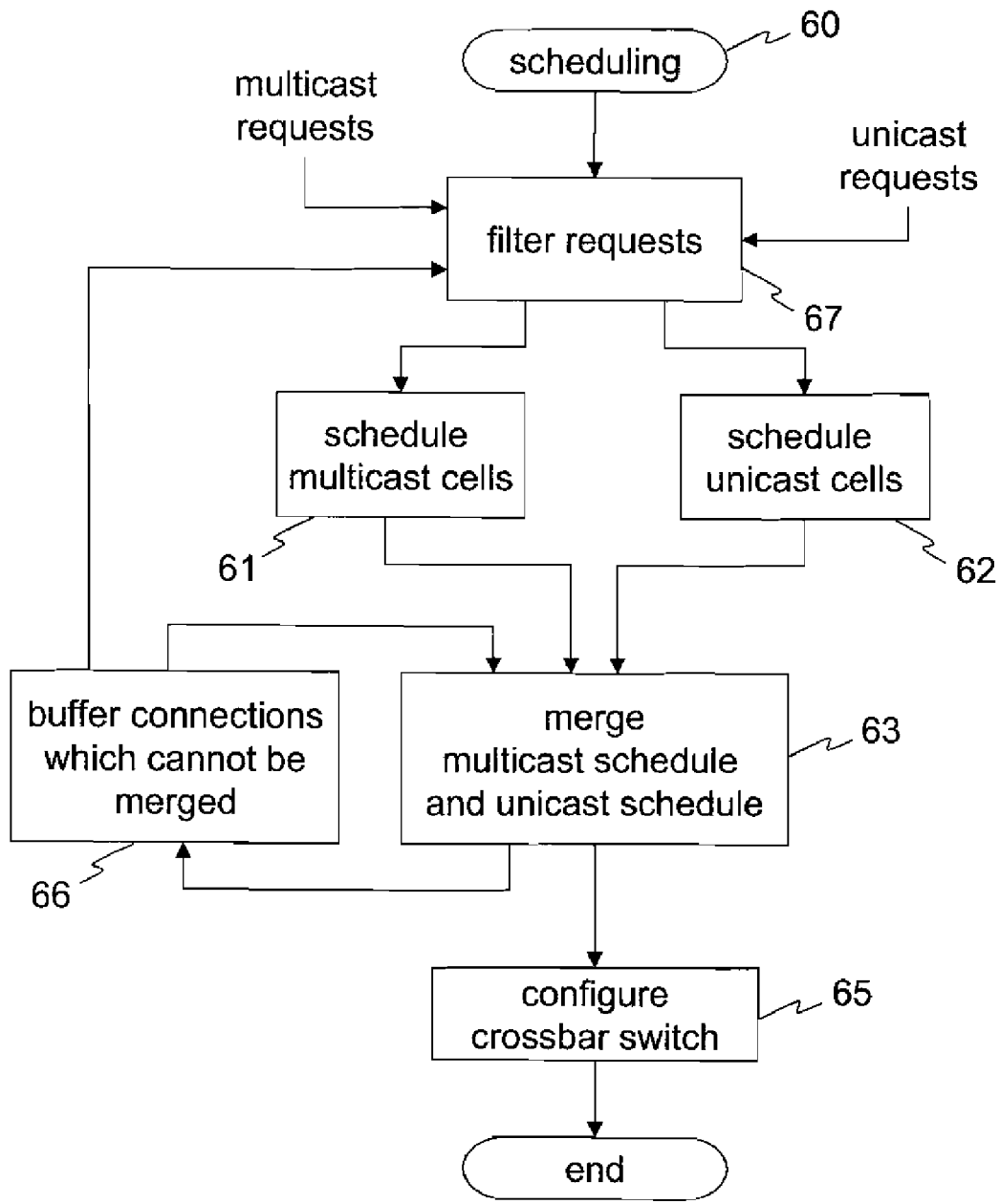

In FIG. 6 the operation of the above described traffic scheduling 60 is depicted. Recapitulatory, this means that in steps 61 and 62 a multicast cell scheduling and independently thereof a unicast cell scheduling is performed. In step 63 the unicast cell schedule and the multicast cell schedule are merged to a merged schedule. In the case a scheduled connection cannot be included in the merged schedule the scheduled connection is buffered (step 66) and included in the merged schedule in a later time slot. The information about those scheduled connections which cannot be included in the merged schedule within one time slot, i.e. which are buffered as remainder, is fed back to the filter which performs in step 67 a filtering. The filter algorithm favors the scheduled connections which are buffered as remainder in step 66 over a multicast or unicast request which has not been scheduled yet, and transmits first the requests corresponding to the buffered scheduled connections to the multicast and/or unicast scheduling steps 61 and 62. With that, the connections which are buffered in step 66 are preferred in an updated merged schedule.

Further Embodiment

Multicast performance might be limited in same cases because at every timeslot, some switch resources are used to discharge the remainder. Although it is essential to eventually serve all edges that are not selected in the merge shall be served, it is not necessary to do so immediately. Thanks to a disjoint remainder property, it is possible to accumulate the remainders produced in consecutive timeslots and serve the individual edges when the conditions are most favorable. The remainder-service policy identifies which edges should be served at every timeslot and filters the corresponding multicast requests. Unicast requests, in contrast, are always filtered using all the accumulated edges to obtain disjoint remainders. A good policy should be able to serve the edges in the remainder rapidly and at the same time cause as little disruption as possible to the flow of multicast cells.

The performance of the switching device can be improved by choosing more carefully which cells in the remainder receive service at every timeslot. This means implementing more complex algorithms in the request filter 14 and providing it more information.

In this further embodiment as shown in FIG. 5 a remainder unicast cell is selected for service only if any of these conditions apply:
1. The cell is destined to an output not requested by multicast, or
2. The cell departs from an input not requested by multicast, or
3. The cell departs from an input that in the previous timeslot has completed service of a multicast cell.

Information regarding conditions 1 and 2 can be deduced from the requests on lines 15 and 16, whereas that regarding condition 3 can be maintained on the line cards 3.1 to 3.N.

The first two rules or conditions aim at improving integration: if it is possible to use a resource that would otherwise remain idle, it is desirable to do so. In this case the cost of serving a remainder edge is to make one output (first rule) or one input (second rule) unavailable to multicast.

With the third rule the integration unit 13 tends to favor cells that contend with fewer others. Generally, cells that have just advanced to the head of line still have their full, usually large, fanout and may cause many conflicts. They are unlikely to receive much consideration, so postponing their scheduling should not significantly affect the quality of the schedule. The third rule enables enhanced fairness: the multicast scheduler 12 guarantees that the head of line cell at any input will be served in finite time; consequently, the inputs become available to serve remainder edges. Algorithms such as TATRA, WBA and mRRM ensure that at least one multicast cell is fully discharged at every time slot. The mRRM algorithm is described in Nick McKeown, Balaji Prabhakar, "Scheduling Multicast Cells in an Input-Queued Switch", Proceedings of IEEE Infocom '96, San Francisco, Vol 1, pp. 271-278, March 1996.

For each cell selected for service, the request filter 14 discards the corresponding multicast requests and notifies the merging unit 13 to issue the grant. Unicast requests are always filtered considering all the edges in the remainder.

The feedback loop 18 and the request filter 14 do not contribute directly to solve conflicts, but are helpful to achieve adaptivity, performance and fairness; the unicast edges in the remainder could simply be discarded.

The embodiment shown in FIG. 5 comprises two additional communication channels 23 and 24. Channel 23 informs the merging unit 13 about which remainder grants should be issued. Channel 24 tells the request filter 14 to which inputs condition 3 applies.

Overcoming Head of Line HOL Blocking

In a simple embodiment of a crossbar switch, all of the cells waiting at each input are stored in a single FIFO queue. When a cell reaches the head of its FIFO queue, it is considered by the centralized scheduler. The cell contends for its output with cells destined to the same output, but currently at the HOL of other inputs. It is the job of the centralized scheduler to decide which cell will go next. Eventually, each cell will be selected and will be delivered to its output across the crossbar switch. With this kind of FIFO queuing cells can be held up by cells ahead of them that are destined to a different output. This phenomenon is called HOL-blocking. The centralized scheduler only "sees" the cell at the head of the FIFO queue, and so the HOL cell blocks packets behind it that need to be delivered to different outputs. Even under benign traffic patterns, HOL blocking limits the throughput to just 60% of the aggregate bandwidth for fixed or variable length packets. When the traffic is bursty, or favors some output ports the throughput can be much worse. To reduce this virtual output queuing (VOQ) can be implemented. At each input, a separate FIFO queue is maintained for each output, as shown in FIG. 1. After a forwarding decision has been made, an arriving cell is placed in the queue corresponding to its outgoing port. At the beginning of each time slot, a centralized scheduling algorithm examines the contents of all the input queues, and finds a conflict-free match between inputs and outputs. In theory, a scheduling algorithm can increase the throughput of a crossbar switch from 60% with FIFO queuing to a full 100% if VOQs are used. This is because HOL blocking has been eliminated entirely: no cell is held up by a cell in front of it that is destined to a different output.

In this context, input-queued means that packets are buffered at the inputs of the switching device, and the centralized scheduler resolves the contentions for the access to the switching fabric. This architecture allows the switching fabric and the memories to run at the same data rate as the input links, thus providing high scalability of the data path.

The present invention has the following advantages. The performance can be improved, because integration is performed at every timeslot. Furthermore, the latency becomes lower, as pointed out above. Also, the automatic adaptivity to traffic pattern variations becomes much better. Over and above this, the fairness becomes better. Finally, the invention solves the problem of scheduling concurrently unicast and multicast traffic whilst aiming to avoid starvation of any connection, regardless of its traffic type.

Having illustrated and described a preferred embodiment for a novel method and apparatus for, it is noted that variations and modifications in the method and the apparatus can be made without departing from the spirit of the invention or the scope of the appended claims.

The invention claimed is:

1. A method for automatically scheduling unicast and multicast connection requests in an interconnecting fabric, comprising performing within each time slot the following steps:
creating a current multicast connection schedule, and independently thereof and simultaneously creating a current unicast connection schedule,
merging the current unicast connection schedule and the current multicast connection schedule to a current merged schedule, wherein, in a case when inputs or outputs of scheduled connections of the current unicast connection schedule overlap with inputs or outputs of scheduled connections of the current multicast connection schedule and cannot be included in the current merged schedule, the overlapping scheduled connections of the current unicast connection schedule are included in a subsequent merged schedule for a later time slot.

2. Method according to claim 1,
wherein all scheduled connections from the current multicast connection schedule are included in the current merged schedule,
wherein those scheduled connections from the current unicast connection schedule that do not conflict with the scheduled connections from the current multicast connection schedule are included in the current merged schedule.

3. Method according to claim 1, wherein the current unicast connection schedule is determined by means of iSLIP, PIM or DRRM.

4. Method according to claim 1, wherein the current multicast connection schedule is determined by means of TATRA, WBA or mRRM.

5. Method according to claim 1, wherein unicast connection requests are buffered in different queues (VOQ1.1-VOQ1.N).

6. Method according to claim 1, wherein multicast connection requests are buffered in a separate multicast queue (MCQ1-MCQN).

7. Method according to claim 1, wherein the scheduled connection that could not be included in the current merged schedule is favored over a connection which has not been scheduled yet, and is included first in a subsequent merged schedule.

8. A device for scheduling unicast and multicast traffic, comprising:
a unicast scheduler for scheduling unicast connections to create a current unicast connection schedule,
a multicast scheduler for scheduling multicast connections to create a current multicast connection schedule,
a merging unit for merging the current unicast connection schedule and the current multicast connection schedule created simultaneously into a current merged schedule, wherein the a case when inputs or outputs of scheduled connections of the current unicast connection schedule overlap with inputs or outputs of scheduled connections of the current multicast schedule and cannot be included in the current merged schedule, the overlapping scheduled connections of the current unicast connection schedule are included in a subsequent merged schedule for a later time slot; and an interconnecting fabric controlled by the merging unit.

9. The device according to claim 8,
wherein the interconnecting fabric comprises an input queued crossbar switch.

10. The device according to claim 8,
wherein a filter is arranged in front of the unicast scheduler and the multicast scheduler and is operable to filter unicast connection requests and multicast connection requests based on the unserved connections that are fed back from the merging unit.

11. A computer program product comprising computer readable program code stored on a non-transitory readable medium for performing within each timeslot the following operations when loaded into a processing unit of a computing device for scheduling unicast and multicast traffic:

performing a multicast connection scheduling to create a current multicast connection schedule, and independently thereof and simultaneously creating a unicast connection scheduling to create a current unicast connection schedule, merging the current unicast connection schedule and the current multicast connection schedule to a current merged schedule, wherein in a case when inputs or outputs of scheduled connections of the current unicast connection schedule overlap with inputs or outputs of scheduled connections of the current multicast schedule and cannot be included in the current merged schedule, the overlapping scheduled connections of the current unicast connection schedule are included in a subsequent merged schedule for a later time slot.

* * * * *